Sept. 20, 1955 H. A. HOWELL ET AL 2,718,562

ERASE HEAD

Filed April 17, 1951 4 Sheets-Sheet 1

INVENTORS
HUGH A. HOWELL
HAROLD W. BAUMAN
BY [signature]
ATTORNEYS

ERASE HEAD

Filed April 17, 1951 4 Sheets-Sheet 2

INVENTORS
HUGH A. HOWELL
HAROLD W. BAUMAN
BY
ATTORNEYS

INVENTORS.
HUGH A. HOWELL
HAROLD W. BAUMAN
BY
ATTORNEYS

Sept. 20, 1955 H. A. HOWELL ET AL 2,718,562

ERASE HEAD

Filed April 17, 1951 4 Sheets-Sheet 4

INVENTORS
HUGH A. HOWELL
HAROLD W. BAUMAN
BY
ATTORNEYS 2,718,562

ERASE HEAD

Hugh A. Howell and Harold W. Bauman, Chicago, Ill., assignors to Ampro Corporation, Chicago, Ill., a corporation of Illinois Application April 17, 1951, Serial No. 221,364

6 Claims. (Cl. 179—100.2)

This invention relates to conditioning of magnetizable record bodies prior to recording thereon of signals by variable magnetization of the material of the record body. More particularly, it relates to conditioning of such a record body by its complete demagnetization. Still more specifically, the invention relates to conditioning of a single recording track area of a tape form record body by an alternating magnetic field of relatively low audio frequency, say of the order of 60 cycles, and without affecting the condition of magnetization of a recording track area parallel to the one being conditioned.

In multiple track tape recording, the most usual procedure is to record on parallel track areas extending longitudinally of, and spaced laterally of the tape form record body; and in erasing a recording track area, the practice is to demagnetize an erasing area wider than the recording track area, but not so wide as to extend into an adjacent recording track.

In magnetic recording on tape form record bodies, heretofore alternating demagnetization has been accomplished most usually by a high frequency alternating field of a frequency of the order of 10 to 30 kilocycles per second. This field generally has been developed across a gap, the pole surfaces of which are spaced in the direction of record body travel so that the record body is drawn past an edge of the gap. The fringing high frequency magnetic field has been concentrated by the record body material in its extent across the gap edge by limitation of the extent of the gap across the record body surface. The high frequency magnetic field has been confined to a single erasing area extended longitudinally of the record body.

Heretofore, conditioning by demagnetizing a record body has been proposed by utilizing a low frequency magnetic field. A low frequency field of the order of sixty cycles, or double that frequency which is convenient by employment of a frequency doubler, or even higher but in the lower audio frequency range presents advantages of producing more power in the magnetic field with expenditure of less energizing electrical power than is required in a high frequency device. However, the tendency of a low frequency and powerful magnetic field to fringe presents a serious problem in application of its use to conditioning a single one of plural erasing areas extending side by side longitudinally of the record body.

One aspect of the invention relates to an erasing or demagnetizing assembly that is capable of energizing only a single erasing track of a record body of tape form having plural such areas extending along it in side by side relation.

A second aspect of the invention relates to a discovery by means of which a recording on the record body of a residual signal at the low frequency of the magnetic field may be completely avoided. It has been discovered that the sudden introduction of record body increments into a magnetic field of intensity sufficient to saturate it results in the reappearance after demagnetization of a recorded signal of the magnetic field frequency. We have discovered that this residual recording may be completely avoided by introducing the record body into a region of magnetic field intensity insufficient to saturate the record body prior to introduction of the record body into a region of magnetic field intensity sufficient to saturate the body.

In accordance with the invention, the record body is passed through a magnetic field region of the lesser intensity prior to its passage through a region of saturating magnetic field intensity and of a length sufficient to insure saturation of all increments of the traveling record body. Following passage of the record body through this latter field region, it is passed through a demagnetizing region of progressively decreasing magnetic field maximum intensities and thereafter passes beyond the magnetic field in a completely demagnetized condition.

Figure 1:
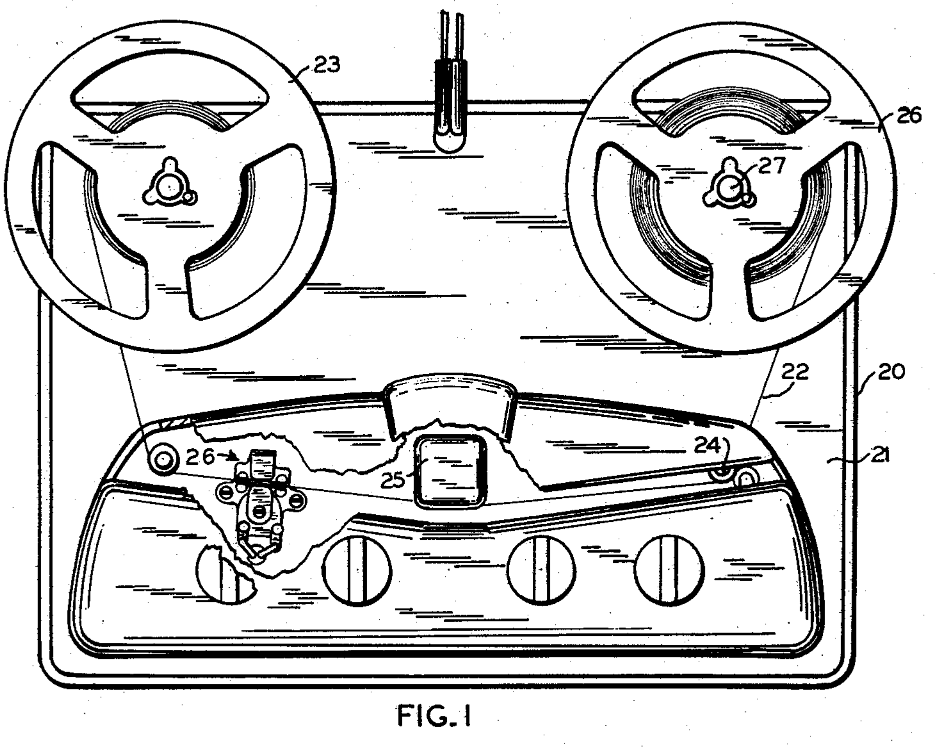
Figure 1 is a top plan of a recording and reproducing instrument arranged for cooperation with a record body of tape form and also arranged to record and reproduce from a pair of parallel recording track areas that extend longitudinally of the tape.

Describing the drawings in detail, and first referring to Figure 1, the magnetic recording and reproducing instrument comprises a casing 20, the top of which is clised by a mechanism plate 21 and that encloses electronic and motor equipment. A tape form record body 22 is stripped from a supply reel 23 and is fed by a power driven capstan 24 past a recording and reproducing head 25. A take-up reel 26 is rotated by a power driven spindle 27 to wind the record body 22 as it is delivered by the capstan 24. In advance of the head 25 is the erasing and conditioning assembly of the invention, which is generally designated 26.

Figure 2:
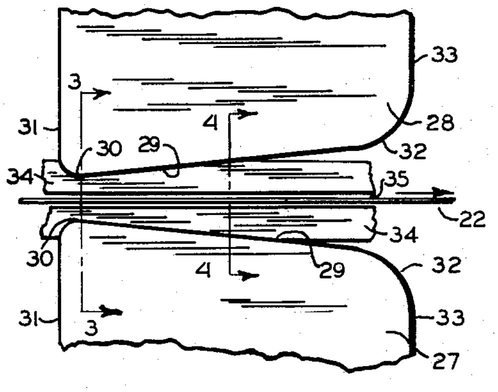
Figure 2 is a greatly enlarged fragmentary plan showing the pole surface contour and record body arrangement that constitutes one aspect of the invention.

Referring to Figure 2, it will be seen that a pair of pole pieces 27, 28, have opposed and facing polar surfaces 29. Surfaces 29 are contoured in the direction of record body travel to provide about points 30 that are spaced inward from the forward edges 31 of the pole pieces a region of minimum spacing between the polar surfaces 29. The spacing, the intensity of the magnetic field produced in the region about point 30, and the frequency of the magnetic field, are all so related to the preselected speed of drive of record body 22 as to provide a field region of record body-saturating intensity of sufficient length in the direction of record body travel to insure saturation of all increments of the record body as it travels through the region about points 30 at the preselected speed. Between the points 30 of minimum spacing and the leading edges 31 of the pole pieces the polar surfaces are contoured to recede from each other in the direction opposite that of record body travel in a region of sufficient extent in the direction of record body travel to insure subjection of all increments of the record body traveling at the preselected speed to magnetic field intensities less than the saturating field intensity prior to their subjection to the latter. Between points 30 of minimum spacing and the exit end of the gap defined by pole surfaces 29, the latter diverge at an angle and over a distance that are so related to field intensities existing at various points between them and to the record body speed, as to subject the record body to several cycles of the alternating magnetic field, each having a maximum intensity less than the preceding one, and diminishing to a final intensity insufficient to magnetize the record body. In this way the demagnetizing of the record body is accomplished in accordance with well-known principles. Conveniently, the surfaces 29 extend from points 30 in the direction of record body travel along planes to a point where maximum field intensity is insufficient to affect the condition of magnetization of the record body, that is to say, a point at which the record body has been demagnetized substantially completely. From such point the polar surfaces 29 are contoured in the direction of record body travel to recede along smoothly curving portions 32 to merge smoothly with the trailing edge surfaces 33 of the pole pieces 27, 28. It will be noted that, as seen on the drawings, the curving entrance and exit reaches of polar surfaces 29 are arcuate and merge smoothly with the plane portions of surfaces 29. This is to avoid the presence of any break or sharp edge in the contours of surfaces 29 that would serve to concentrate magnetic field portions and thereby provide a region of sudden and sharp change of magnetic intensity. Any such sharp and sudden change tends to produce a recording on the record body at the frequency of the magnetic field.

In order to confine the lateral extent of the magnetic field developed between surfaces 29 to a single one of plural erasing areas of preselected width that extend side by side along the tape form record body, the thickness of the pole pieces 27, 28 and therefore the lateral dimension of the polar surfaces 29, is limited to substantially the preselected width of the record body erasing area. Related to this dimension of the lateral extent of surfaces 29 is their spacing and the intensity of the maximum magnetic field developed in the region about points 30. It is well known that the more intense a magnetic field is, the more it tends to spread in its extent across a non-magnetic gap defined between two polar surfaces of a magnetic circuit. It is also well known that the degree of such magnetic field spreading is a function of increasing spacing between such magnetic circuit surfaces. In the arrangement of the invention points 30 of the respective polar surfaces 29 are spaced apart substantially at the minimum distance that will permit a tape form record body to pass between them with its opposite sides facing the respective surfaces 29 and to keep the magnetizable material of the record body out of contact with surfaces 29 at the point of minimum spacing of the latter. The base side of a tape coated only on one side with magnetic material may contact the facing pole surface without adverse effect. By this spacing, and by selection of the amplitude and density of magnetic flux imposed on pole pieces 27, 28, a maximum magnetic field intensity is produced in the region of points 30 sufficient to saturate the record body, but insufficient to cause spreading beyond the lateral extent of surfaces 29 of magnetic field portions of sufficient intensity.

Figure 3:
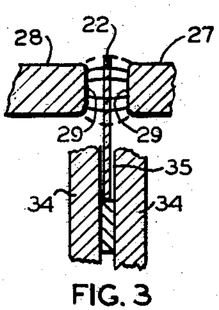
Figure 3 is a section on line 3—3 of Figure 2.
Figure 4:
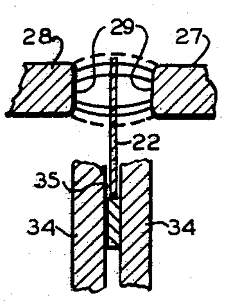
Figure 4 is a section on line 4—4 of Figure 2.
Figure 5:
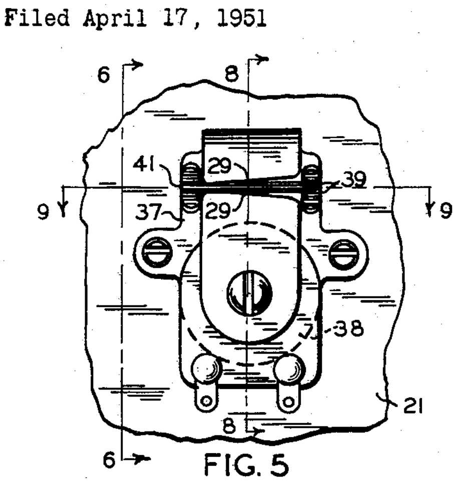
Figure 5 is an enlarged top plan of an assembly embodying the invention.
Figure 6:
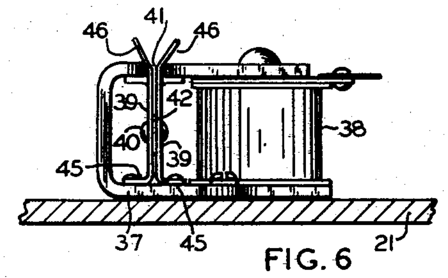
Figure 6 is an end elevation of the entrance end of such an assembly, showing the device mounted on a vertical supporting surface.
Figure 7:
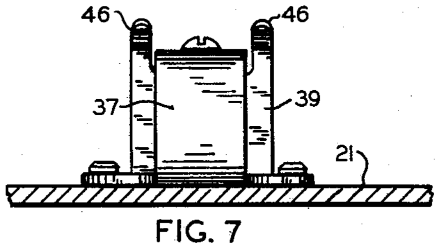
Figure 7 is a side elevation of the device in Figure 5.
Figure 8:
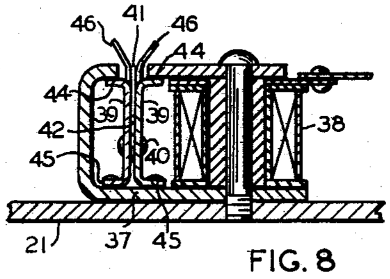
Figure 8 is a section on line 8—8 of Figure 5.
Figure 9:
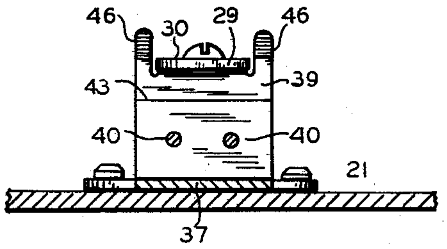
Figure 9 is a section on line 9—9 of Figure 5.

A necessary part of the invention comprises guide means for accurately positioning the record body relative to polar surfaces 29 to position the record body transversely to pass between points 30 of minimum spacing, with its magnetizable material out of contact with polar surfaces 29, and to position the record body laterally for registration of a selected one of its erasing areas with polar surfaces 29. As shown in Figures 2 to 4, a structure 34 that defines a record body guiding slot 35 is so associated with pole pieces 27, 28, as to accomplish the necessary transverse and lateral positioning of the record body.

The distribution of maximum field intensities along the non-magnetic gap defined by surfaces 29 is suggested by Figures 3 and 4. In Figure 3 the relatively intense magnetic field which, as has been stated, is sufficient to saturate the record body, is concentrated substantially between polar surfaces 29 due to their close spacing. As the surfaces 29 recede from each other the magnetic field intensity decreases and, although it tends to increase its spreading along the gap due to progressively increasing spacing between surfaces 29, the decrease in its intensity is such that portions that spread to an erasing area adjacent the one registered with polar surfaces 29 are insufficient to affect the condition of magnetization of the portion of the record body lying in the adjacent erasing area. Such portions of magnetic fields of intensities insufficient to affect the record body condition of magnetization are suggested by the dotted lines in Figures 3 and 4, the solid lines representing the more intense magnetic field that does affect the condition of magnetization of the record body. It is to be noted that the magnetic field extends through rather than along the tape.

As a specific example of a polar surface arrangement that has proved satisfactory in accomplishing demagnetizing conditioning of a conventional tape form record body having a width of one-quarter inch, a thickness of approximately two one-thousandths of an inch, and requiring a magnetic field strength of approximately one thousand gausses for saturation, and to accomplish erasing, by sixty cycle alternating current, of an erasing area of the width of one-half the record body traveling at a speed of three and three-quarters inches per second, the following dimensions are given: The pole pieces had parallel leading and trailing edges 31, 33 spaced apart a distance of five-eighths of an inch. At the indicated frequency and record speed this pole piece dimension results in a field length of some 9 or ten cycles and such a field length has been found adequate to accomplish complete conditioning of the record body in accordance with the invention. The thickness of the pole pieces 27, 28 and, consequently, the lateral dimension of polar surfaces 29, was one-eighth inch, corresponding to one-half the record body width. The minimum gap length, that is to say, the spacing between points 30 of the respective polar surfaces 29, was within a normal manufacturing range of fifteen one-thousandths of an inch. Polar surfaces 29, between the points 30 of minimum spacing and the leading pole piece edges 31, were contoured arcuately on a radius of one-sixteenth inch and at the exit end of the gap the reaches 32 of the polar surfaces 29 were contoured arcuately on radii of one-eighth of an inch. The ends of the plane reaches of surfaces 29, that is to say, the points at which such reaches merged with the arcuate reaches 32, were spaced apart in a tolerance range of one hundred fifty to one hundred sixty-five one-thousandths of an inch. The magnetic circuit, of which pole pieces 27, 28 comprised elements, was energized by an electrical winding and current productive of approximately one hundred twenty-five ampere turns. By this dimensional relation of the gap length and depth to the record speed and at the frequency and amplitude of magnetic force developing the field between polar surfaces 29, a highly satisfactory demagnetization of the record body was accomplished and very little residual magnetization of the record body at the frequency of the energizing field was produced.

The invention also relates to specific structural arrangements of erasing heads in accordance with the principles of the invention described above. Figures 5 to 9 inclusive disclose one form of such structural arrangement. One of the pole pieces 28 serves as a mounting structure for the assembly, being rebent into a channel form having a leg 37 for attachment to an instrument cover plate 21. The electrical winding 38 is secured between leg 37 of pole piece 28 and the second pole piece 27, which is of simple plate form. The structure of winding 38 acts as a spacer between pole pieces. The gap defined between polar surfaces 29 is laterally spaced from the axis of winding 38, and in the space between the gap and pole piece leg 37 a guide structure is mounted. Conveniently, this guide structure comprises a pair of strips 39 that are secured in facing parallel relation by a fastener device 40 and that are spaced apart a distance sufficiently greater than the thickness of the record body to permit free travel of the latter between them. By a spacing that is somewhat less than the minimum spacing between points 30 of the polar surfaces, the slot 41 that is defined between strips 39 has its central longitudinal plane registered with the longitudinally median plane of the gap between surfaces 29 and thereby a portion of a record body that has one edge engaged in slot 41 is guided in the gap with its surfaces facing but out of contact with polar surfaces 29 throughout the longitudinal extent of the gap in the direction of record body travel. Spacing of the guide strips 39 conveniently is accomplished by a spacer strip 42 that is mounted between them and secured by the fastener 40. The edge 43 of the spacer strip forms an edge guide for a record body traveling through slot 41 and is spaced from the more adjacent edges of polar surfaces 29 to register one of the record body erasing areas with surfaces 29. To accomplish the proper spacing of edge 43 from the margins of polar surfaces 29, strips 39 may have outwardly bent marginal portions 44 that form positioning surfaces for contact with the surfaces of pole pieces 27, 28, to opposite sides of the non-magnetic gap and that are properly spaced from edge 43 to accomplish the proper lateral positioning of the record body. The strips 39 also may have outward feet portions 45 that contact the inner surface of pole piece leg 37 and that are secured to the latter by suitable means.

Since the slot 41 and the spacing between polar surface points 30 are very narrow, it is advantageous to provide threading guide means. Conveniently, this may be accomplished by extending guide strips 39 beyond the edge surfaces 31, 33 of the pole pieces and providing them with outwardly diverging threading throats defined between laterally projecting portions 46 of the strip extensions.

Figure 12:
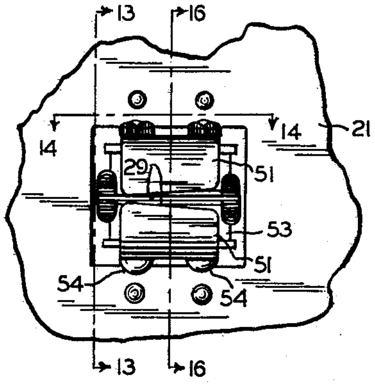
Figure 12 is a top plan of a modified structural arrangement of a conditioning device embodying the invention.
Figure 13:
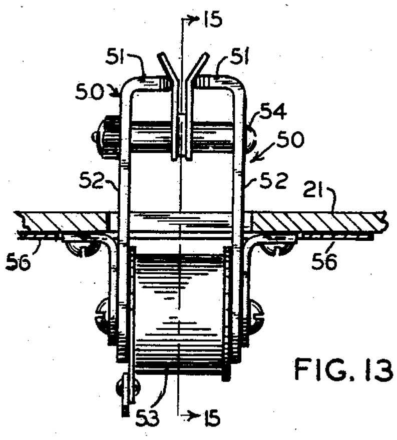
Figure 13 is a fragmentary entrance end elevation of a form of the invention of Figure 12.
Figure 14:
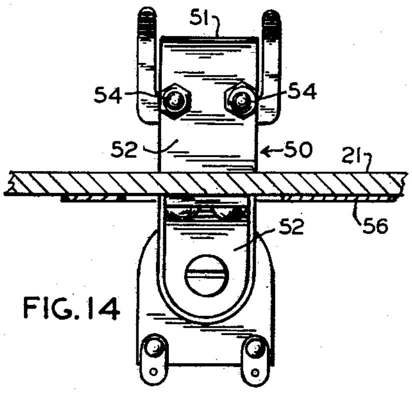
Figure 14 is a side elevation thereof.
Figure 16:
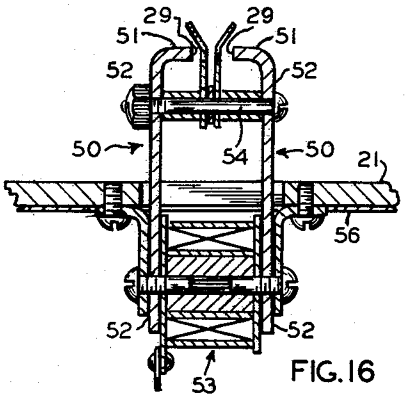
Figure 16 is a section on line 16—16 of Figure 12.
Figure 15:
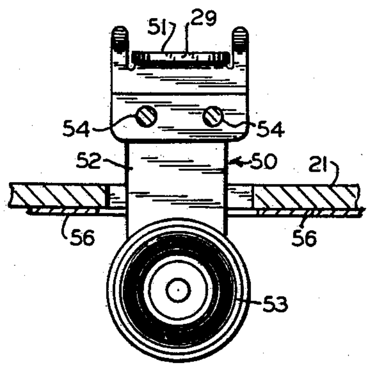
Figure 15 is a section on line 15—15 of Figure 13.

Referring now to Figures 12 to 16 the modified magnetic circuit structure comprises a pair of right and left hand pole pieces 50, each of which is substantially L-shaped. Pole pieces 50 have end reaches 51 that terminate in polar surfaces 29 and side reaches 52 that extend parallel and between which is mounted the winding assembly 53. A guide assembly similar to that described above may be mounted on bolts 54 that penetrate the side pole piece reaches 52. Mounting brackets 55 are secured to the pole piece reaches 52. As shown in Figures 12 and 13, the electrical winding 53 may be disposed to an inner side of an electronic equipment chassis member 56 that, in turn, is mounted behind or under a cover plate 21. This type of assembly is useful in a situation where the winding 53 is energized by line current, since, in such situations, for safety, it is desirable that all electrical circuit means be contained within a grounded conductive structure.

Figure 10:
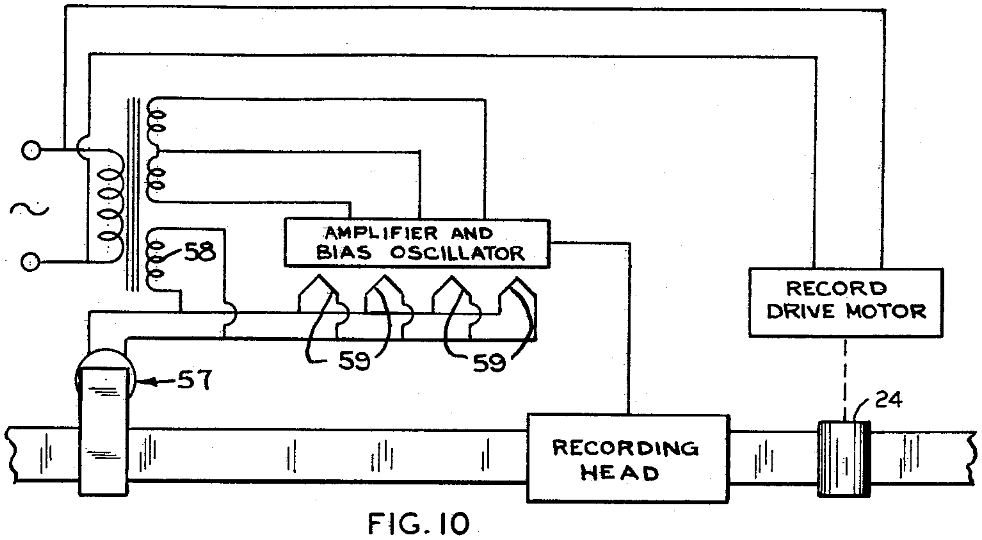
Figure 10 is a schematic diagram disclosing one system for energizing the conditioning device.
Figure 11:
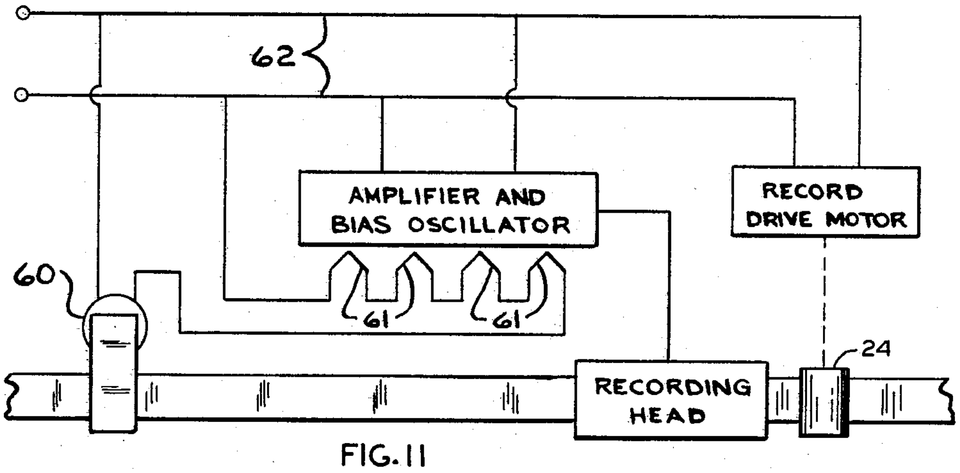
Figure 11 is a similar schematic diagram disclosing an alternative arrangement for energizing the device.

As disclosed by Figures 10 and 11, various circuit arrangements may be resorted to for energizing a magnetic demagnetizing assembly of the type disclosed above and designed to operate at low frequency. Assuming that the preselected frequency is that of alternating line voltage used to energize the amplifier and oscillator that normally form parts of magnetic recording instruments, and to operate the record body driving motor, the magnetic circuit electrical winding 57 may be energized by a special section 58 of a power supply transformer secondary winding, as shown in Figure 10, and connected parallel with tube heater filaments 59. It may be desirable, as shown in Figure 11, especially in the case of an instrument designed for the so-called A. C.–D. C. type of operation, to connect the electrical winding 60 of the demagnetizing assembly in series with a string of amplifier tube heater filaments 61 across power input lines 62.

Figure 17:
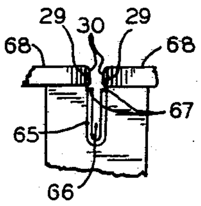
Figures 17 and 18 are fragmentary entrance end elevations of conditioning assemblies provided with specialized modifications of the record body guiding means.

In certain cases, and for various reasons, it may be desirable to make the minimum spacing between points 30 of polar surfaces 29 sufficiently great with respect to the amplitude and density of magnetic flux energizing the magnetic circuit to produce some fringing of magnetic field portions of intensities sufficient to affect the condition of magnetization of the record body sufficiently far laterally of the polar surfaces 29 to reach an erasing area adjacent to the one registered with the gap. In such case an adverse effect of the fringing field upon the record body outside, but alongside, the gap may be avoided in two ways, shown respectively by Figures 17 and 18. In Figure 17 the guide for the record body comprises a U-shaped channel defining member 65 that is of high magnetic permeability. This member 65 is supported with its channel 66 properly registered with the gap defined by polar surfaces 29, for proper transverse and lateral positioning the record body having one edge engaged in it, but with the lateral edges 67 of member 65 spaced from contact with pole pieces 68 to avoid production of a magnetic short circuit. Member 65 is suitably supported in assembly with the magnetic circuit structure by a supporting device 69.

Figure 18:
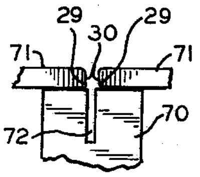

In Figure 18 the guide means is constituted by a substantial block 70 of electrically conductive material of low magnetic permeability such as brass or aluminum, to provide the attenuation of magnetic field intensity by development of eddy currents. Block 70 is suitably assembled with pole pieces 71 and has therein a record body-guiding slot 72 having its central plane registered with the longitudinal median plane of the gap defined by the polar surfaces 29.

In the development of magnetic field producing structures for energization at low frequency and for acting on only a single one of plural erasing areas, it was found that sharp corners between the margins of polar surfaces 29 that are disposed toward an erasing area adjacent the one registered with the polar surfaces and the angularly related surfaces of the pole piece produce a concentration of the magnetic field, causing fringing into the adjacent erasing area. It has been discovered that this fringing can be completely eliminated by smoothly rounding off and polishing the sharp corners that normally result from standard production methods. It was further discovered that an irregularity of the polar surfaces or of the pole piece surfaces adjacent them similarly tended to produce either fringing laterally beyond the non-magnetic gap which resulted in unintended erasing of the adjacent area, or such irregularity resulted in concentration of the magnetic field as to cause a too rapid change in field intensities to which the record body was subjected, thereby causing a recording at the magnetic field frequency. All these disadvantageous effects can be avoided by suitable grinding and/or sandblasting of the parts of the pole pieces adjacent polar surfaces 29. Sandblasting, following grinding if the latter is necessary to round off the edge corners, results in a smooth polishing of the polar surfaces 29 and in certain cases may of itself sufficiently remove the corners in the regions designated 75 in Figures 3 and 4 to avoid the adverse action of the magnetic field in either of the above-noted undesirable ways. The smooth polishing of the polar surfaces, the pole piece surfaces adjacent them, and the corners connecting such surfaces with the polar surfaces, proved to be the final step in development of a low frequency magnetic conditioning head for performing an erasing and conditioning action on only a single one of plural erasing areas of a tape form record body.

We claim:

1. In an assembly for conditioning an elongate magnetizable record body by passing it longitudinally and at a preselected speed through a magnetic field alternating in polarity at a frequency in the lower audio range and having a peak intensity pattern and length in the direction of record body travel for subjecting each magnetizable increment of the record body serially to maximum peak magnetic field intensities sufficient to saturate them, thereafter to subject them to a preselected number of alternating field peak intensities progressively decreasing but sufficient to affect their magnetic conditions, and finally decreasing to intensities insufficient to affect the magnetic conditions of said increments, said assembly including a magnetic circuit structure provided with a pair of pole pieces and an electrical winding linked therewith for developing therein magnetic flux of predetermined peak density when energized by alternating current of preselected amplitude; the improvement preventive of residual magnetization of the record body by said field during entrance of the former into the latter, in arrangement of gap-defining polar surfaces of the respective pole pieces that are spaced in facing relation to provide for longitudinal passage between them of a record body, and wherein said surfaces include demagnetizing reaches relatively divering laterally from the record body path and in the direction of record body travel, from a minimum spacing, for a length and at divergence angles so related to said record body speed and flux density as to provide said field peak intensity pattern, said improvement comprising entrance throat-defining portions of said reaches at points of interspacing of the latter productive therebetween of peak field intensities sufficient to affect the magnetic conditions of said increments, and curving smoothly away from the record path in the direction opposite to that of record body travel to spacings between them productive of peak field intensities less than sufficient to affect the magnetic conditions of said increments.

2. In an assembly for conditioning an elongate magnetizable record body by passing it longitudinally and at a preselected speed through a magnetic field alternating in polarity at a frequency in the lower audio range and having a peak intensity pattern and length in the direction of record body travel to subject all magnetizable increments of the record body to peak magnetic field intensity sufficient to saturate them and thereafter to subject them to a preselected number of alternating field peak intensities progressively decreasing but sufficient to affect the magnetic condition of the increments, and finally to withdraw said increments from said field, said assembly including a magnetic circuit structure provided with a pair of pole pieces and an electrical winding linked therewith for developing therein magnetic flux of predetermined peak density when energized by alternating current of preselected amplitude; the improvement preventive of residual magnetization of the record body by said field in leaving of the latter by the former, in arrangement of gap-defining polar surfaces of the respective pole pieces that are spaced in facing relation to provide for longitudinal passage between them of a record body, and wherein said surfaces include demagnetizing reaches relatively diverging from the record body path and in the direction of record body travel, from a minimum spacing so related to said flux density as to provide for said record body increment saturation, and at an angle and for a distance so related to said flux density, frequency and record body speed as to provide subjection of said increments to said preselected number of alternating, decreasing peak intensities sufficient to affect the magnetic condition of said increments, said improvement comprising a length of said diverging reaches to a spacing productive of peak field intensities less than sufficient to affect the magnetic condition of said increments, and exit throat-defining portions of said surfaces smoothly merged with said reach extensions and smoothly curving away from said record body path in the direction of record body travel.

3. In an assembly for conditioning an elongate magnetizable record body by passing it longitudinally and at a preselected speed through a magnetic field alternating in polarity at a frequency in the lower audio range and having a peak intensity pattern and length in the direction of record body travel to subject all magnetizable increments of the record body to a preselected number of peak magnetic field intensities sufficient to saturate them and thereafter demagnetizing them by subjecting them to a preselected number of alternating field peak intensities progressively decreasing but sufficient to affect the magnetic condition of the increments, and finally to withdraw said increments from said field, said assembly including a magnetic circuit structure provided with a pair of pole pieces and an electrical winding linked therewith for developing therein magnetic flux of predetermined peak density when energized by alternating current of preselected amplitude, the improvement in arrangement of gap-defining polar surfaces of the respective pole pieces, productive of said demagnetizing and preventive of residual magnetization of the record body in leaving said field, comprising a plane reach of each said polar surface, diverging one from the other continuously along single planes, in the direction of record body travel, from a minimum spacing and at a divergence angle that are so related to said flux density, record body speed and each other as to subject each of said increments to said preselected numbers of saturating and demagnetizing field intensities, said plane, diverging reaches being extended to points at which their interspacing is so related to said flux density as to produce peak field intensity less than sufficient to affect the magnetic condition of said increments, and said surfaces having exit throat-defining portions smoothly merged with said reaches at said points and curving smoothly away from the record body path in the direction of record body travel.

4. In an assembly for conditioning an elongate magnetizable record body by passing it longitudinally and at a preselected speed through a magnetic field alternating in polarity at a frequency in the lower audio range and having a peak intensity pattern and length in the direction of record body travel to subject all magnetizable increments of the record body to peak magnetic field intensity sufficient to saturate them, thereafter to demagnetize said increments by subjecting them to a preselected number of alternating field peak intensities progressively decreasing but sufficient to affect their magnetic conditions, and finally withdrawing said record body from said field, said assembly including a magnetic circuit structure provided with pole pieces, and an electrical winding linked therewith for developing therein magnetic flux of predetermined peak density when energized by alternating current of preselected amplitude; the improvement in arrangement of gap-defining polar surfaces of the respective said pole pieces, productive of said field intensity pattern and preventive of residual magnetization of a record body in both entering and leaving said field, and wherein said polar surfaces include facing demagnetizing reaches that diverge away from the record body path in the direction of record body travel at angles and for a distance so related to said peak flux density and record body speed as to subject said increments to said saturation and demagnetizing, said improvement comprising entrance throat-defining portions of said surfaces smoothly merged with said reaches at points where the interspacing between them is productive of peak field intensity sufficient to saturate said increments and curving smoothly away from said path in the direction opposite to that of record body travel and to an interspacing related to said flux density to produce peak field intensity less than sufficient to saturate said increments, extensions of said diverging demagnetizing reaches to provide sections wherein their interspacing is so related to said flux density as to produce peak field intensities less than sufficient to affect the magnetic conditions of said increments, and exit throat-defining portions of said surfaces smoothly merging with said reach extensions and curving smoothly and laterally away from the record body path in the direction of record body travel.

5. In an assembly for conditioning an elongate magnetizable record body by passing it longitudinally and at a preselected speed through a magnetic field alternating in polarity at a frequency in the lower audio range and having a peak intensity pattern and length in the direction of record body travel to subject all magnetizable increments of the record body to a preselected number of peak field intensities sufficient to saturate them, thereafter to demagnetize said increments by subjecting them to a preselected number of alternating field peak intensities progressively decreasing but sufficient to affect the magnetic condition of said increments, and finally withdrawing said record body from said field, said assembly including a magnetic circuit structure provided with pole pieces, and an electrical winding linked therewith for developing therein magnetic flux of predetermined peak density when energized by alternating current of preselected amplitude; the improvement in arrangement of gap-defining polar surfaces of the respective said pole pieces, productive of said field intensity pattern and preventive of residual magnetization of a record body in both entering and leaving said field, comprising intermediate opposed, plane, demagnetizing reaches of said surfaces respectively extended along planes that diverge from the record path and in the direction of record body travel in angular relations thereto and for distances so related to said peak flux density and record body speed to subject the record body as it passes between them both said preselected numbers of saturating and demagnetizing peak field intensities, extensions of said surfaces beyond said reaches, along the respective same said planes and providing sections between which the spacing distance is so related to said flux density as to provide peak field intensities less than sufficient to affect the magnetic conditions of said increments, entrance throat-defining portions of said surfaces smoothly merged with the respective said reaches at points between which the distance between them is so related to said peak flux density as to produce peak field intensities sufficient to saturate said record body increments and smoothly curving away from said record body path, in the direction opposite to that of record body travel and to interspacing so related to said peak flux density as to provide between them peak field intensity less than sufficient to affect the magnetic condition of said increments, and exit throat-defining portions of said surfaces smoothly merged with said reach extensions and smoothly curved away from the record body path in the direction of record body travel.

6. In an assembly for demagnetizing conditioning of a magnetizable tape form record body by passing successive increments thereof through saturating and demagnetizing portions of a magnetic field alternating at a frequency in the lower audio range, and including a magnetic circuit structure provided with a gap for developing said field and through which said increments are to be passed; means for guiding the record body in a definite path a gap-defining arrangement for confining conditioning effect of said field to a single track area of less width than the record body, comprising a pair of flat pole pieces of uniform thickness substantially equal to said track area, disposed with corresponding edge surfaces that are contoured to provide said magnetic field facing each other and opposite sides of the path of said track area, said pole pieces having leading and trailing edges with respect to direction of the record body travel and that are angularly related to said edge surfaces, and flat, parallel surfaces angularly related to said edge surfaces and edges, and all angularly related portion of said edge surfaces, and said angularly related surfaces and edges being connected with smoothly curved surface portions smoothly merged with them.

References Cited in the file of this patent

UNITED STATES PATENTS

| | | |
|---|---|---|
| 1,837,586 | Rhodehamel | Dec. 22, 1931 |
| 2,498,423 | Howell | Feb. 21, 1950 |
| 2,604,550 | Begun | July 22, 1952 |

FOREIGN PATENTS

| | | |
|---|---|---|
| 591,711 | France | July 1, 1930 |